United States Patent [19]
Heuvelmans et al.

[11] Patent Number: 6,137,225
[45] Date of Patent: Oct. 24, 2000

[54] LOW-PRESSURE DISCHARGE LAMP WITH FILAMENT HAVING PROTECTIVE COATING

[75] Inventors: Jean J. Heuvelmans; Andreas S. G. Geven, both of Eindhoven, Netherlands

[73] Assignee: U.S. Philips Corporation, New York, N.Y.

[21] Appl. No.: 09/174,220

[22] Filed: Oct. 16, 1998

[30] Foreign Application Priority Data

Oct. 22, 1997 [EP] European Pat. Off. .............. 97203309

[51] Int. Cl.[7] ...................................................... H01K 1/26
[52] U.S. Cl. ............................................ 313/580; 313/631
[58] Field of Search .................................... 313/580, 489, 313/631

[56] References Cited

U.S. PATENT DOCUMENTS 5,233,268  8/1993  Heuvelmans et al. ................... 313/491
6,049,164  4/2000  Kemenade et al. ...................... 313/492

FOREIGN PATENT DOCUMENTS 0777261  6/1997  European Pat. Off. ......... H01J 61/10

*Primary Examiner*—Vip Patel
*Attorney, Agent, or Firm*—F. Brice Faller

[57] ABSTRACT

At least one of the electrodes (6*a*) has a coil (60*a*) of a refractory metal which is electrically connected to current supply conductors (7*a*, 7*a*') which extend to outside the discharge vessel. The coil (60*a*) has a central portion (61*a*) which is coated with an electron-emitting material and an end portion (62*a*, 62*a*) on either side thereof, which end portions are covered with a protecting material which is mainly formed by one or more oxides of calcium and/or magnesium.

4 Claims, 2 Drawing Sheets

LOW-PRESSURE DISCHARGE LAMP WITH FILAMENT HAVING PROTECTIVE COATING

BACKGROUND OF THE INVENTION

The invention relates to a low-pressure discharge lamp provided with a discharge vessel which is closed in a gastight manner and which contains an ionizable filling, and further provided with electrodes for maintaining an electric discharge in the discharge vessel. At least one of the electrodes being positioned inside the discharge vessel, which electrode comprises a coil of a refractory metal which is electrically connected to current conductors which extend to outside the discharge vessel. The coil has a central portion which is coated with an electron-emitting material and has end portions on either side between the central portion and respective current conductors, which end portions are coated with a protective material.

The invention also relates to a compact fluorescent lamp.

Such a lamp is known from U.S. Pat. No. 5,233,268. The known lamp is a low-pressure mercury discharge lamp with a tubular discharge vessel in which an electrode of the kind described above is arranged at each end. The central portion of the coil of each electrode is coated with an electron-emitting material which is composed of a mixture of oxides of the alkaline earth metals barium, calcium, and strontium. Usually, the electron-emitting material in such lamps is provided in that the central portion is coated with a suspension of carbonates of said alkaline earth metals. After the electrodes have been positioned in the discharge vessel, but before the discharge vessel is closed, the electrodes are resistively heated in that a current is passed through them. This achieves a conversion of the carbonates into oxides, with carbon dioxide being released. The end portions of the electrodes, usually having a length of approximately 1 to a few millimetres, are usually kept free from electron-emitting material because these portions do not become hot enough during the heating process for a full conversion of the carbonates to take place in the suspension provided there. This would have the result that the conversion of carbonates takes place subsequently during lamp operation. The evolved carbon dioxide would seriously interfere with further lamp operation.

It is attractive to operate low-pressure discharge lamps by means of a supply unit with cold ignition, i.e. a supply unit which ignites the lamp without preheating the electrodes. Such a supply unit is comparatively simple and inexpensive because additional means for preheating the electrodes are unnecessary. The operational lives of lamps with such supply units, however, are mainly determined by their switching lives, i.e. the number of times the lamp can be switched on, in the case of short operational periods, i.e. shorter than one hour.

The current conductors to the electrode in the known lamp are each coated with a glass sleeve which also covers the end portions of the coil. This measure prevents the discharge arc from applying itself to end portions of the coil not coated with electron-emitting material in the case of cold ignition and thus prolongs the switching life of the lamp. It is a disadvantage, however, that the sleeves are comparatively difficult to fasten. This is particularly disadvantageous in the case of large-scale manufacture of the lamp.

SUMMARY OF THE INVENTION

It is an object of the invention to provide a low-pressure discharge lamp which is comparatively simple to manufacture and which nevertheless has a long switching life.

According to the invention, the protective material is mainly formed by one or more oxides of calcium and/or magnesium.

The protective material can be easily applied to the end portions of the electrode in the lamp according to the invention. In an attractive method, the central portion and the end portions of the coil are coated in that order with a first and with a second suspension from which the electron-emitting material and the protective material, respectively, are obtained. The first suspension comprises, for example, a mixture of carbonates of calcium, strontium, and barium. The second suspension comprises, for example, magnesium carbonate. After being coated with these suspensions, the electrode can be mounted in the discharge vessel in a usual manner and subsequently be resistively heated, whereupon the discharge vessel is given its filling and is closed. The carbonates of magnesium and calcium have comparatively low dissociation temperatures (approximately 600 and approximately 700° C., respectively), so that they are fully converted into oxides in spite of the comparatively low temperatures at the end portions of the coil.

The protective material obtained after the conversion is mainly formed by one or several oxides of calcium and/or magnesium. The protective material, however, may comprise compounds which are formed between the material of the electrode coil and said alkaline earth metals during the conversion. If a tungsten coil is used, the protective material may comprise, for example, up to 15 mole % of tungstates.

It is noted that a low-pressure mercury discharge lamp is known from EP 777 261 A1 in which the end portions of the electrodes are coated with a ceramic material having a resistivity of less than 1000 $\mu\Omega$, for example zirconium boride. It is unknown, however, whether interactions take place between these materials and other ingredients inside the lamp, such as ingredients of the filling and of the electron-emitting material, in the case of long lamp operation.

Alkaline earth metals were found to be suitable in practice as ingredients in electron-emitting material. It was surprisingly found that the use of oxides of magnesium and/or calcium as a protective material on the end portions of the coil leads to a considerable increase in the switching life. As described above, the protective material may be formed in that said oxides are provided on the end portions on either side of the electron-emitting material, i.e. on either side of the central portion of the coil, through a simple adaptation of existing production processes.

A favorable embodiment of the low-pressure discharge lamp according to the invention is characterized in that the electron-emitting material comprises barium oxide. The inventors have found that the switching life is longer in proportion as the discharge arc assumes a stable position on the central portion of the coil more quickly after switching-on of the lamp. This is promoted by the presence of barium oxide in the electron-emitting material.

In an embodiment of the lamp according to the invention, one of the electrodes is provided with a protective material as described above. Such a lamp may have a long switching life when operated on a supply unit with DC operation at least during ignition, the electrode provided with the protective material being the cathode. A practical embodiment of the low-pressure discharge lamp according to the invention is characterized in that each of the electrodes is provided with a protective material as described above. Such a lamp has a long switching life also when operated on an AC supply.

The invention also relates to a compact fluorescent lamp comprising a housing supporting a low-pressure discharge lamp according to the invention, wherein the ionizable filling comprises mercury and at least one rare gas, wherein the discharge vessel is provided with a luminescent layer on an inner surface, wherein the housing in addition supports a lamp cap with contacts, and wherein a cold-igniting supply unit for the low-pressure discharge lamp is accommodated in the housing, said supply unit being connected to the contacts. The compact fluorescent lamp is suitable for replacing an incandescent lamp Since the electrodes are not preheated, the compact fluorescent lamp is capable of giving light immediately after switching on, as is an incandescent lamp.

DETAILED DESCRIPTION OF THE PREFERRED EMBODIMENTS

Figure 1:
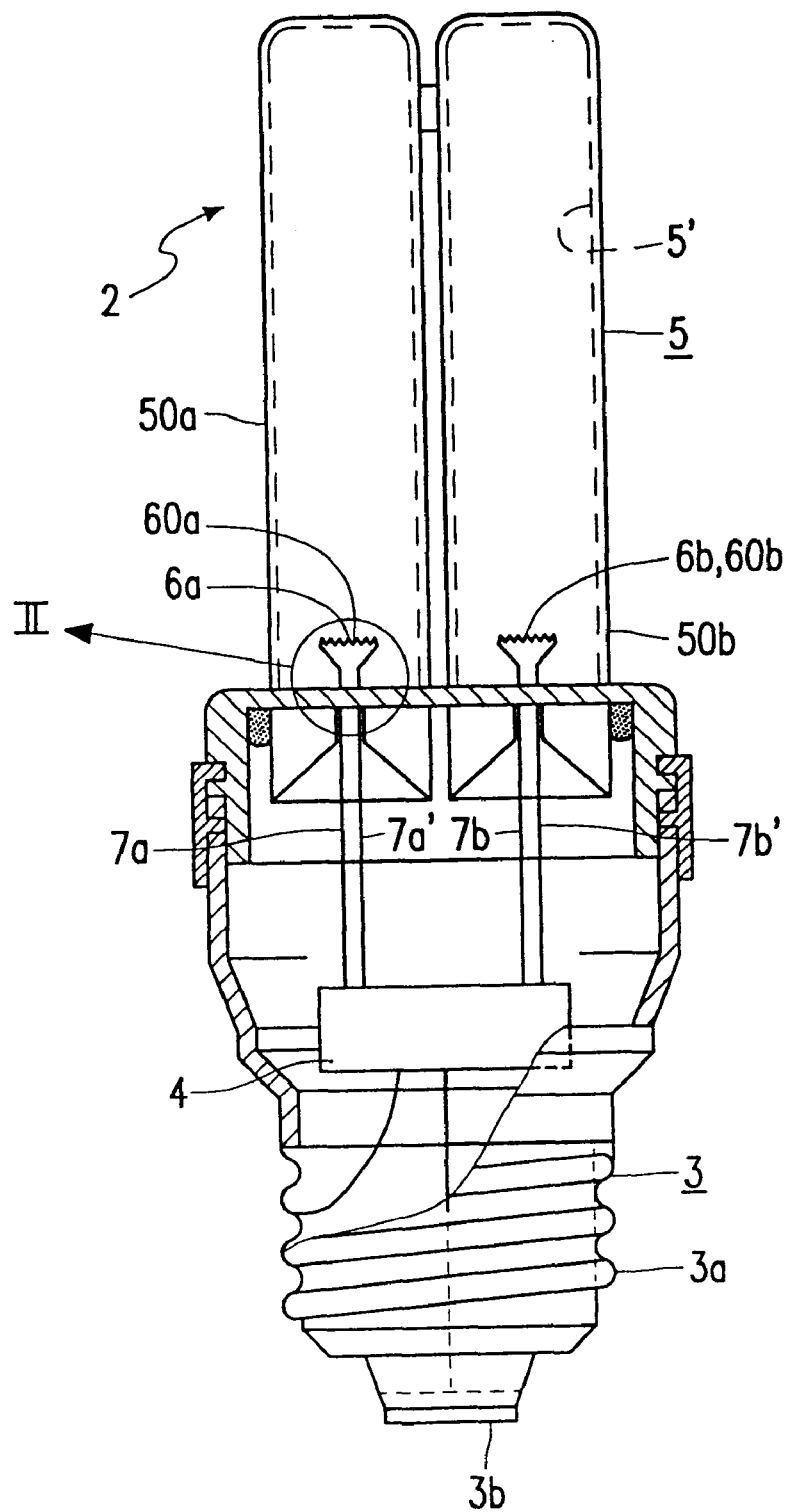
FIG. 1 shows an embodiment of a compact fluorescent lamp comprising a low-pressure discharge lamp according to the invention in longitudinal sectional view.

FIG. 1 shows a compact fluorescent lamp with a housing 1 which supports a low-pressure discharge lamp 2. The housing 1 further supports a lamp cap 3 with contacts 3a, 3b. A cold-igniting supply unit 4 for the low-pressure discharge lamp is accommodated in the housing 1. The supply unit 4 is connected to the contacts 3a, 3b.

The low-pressure discharge lamp of FIG. 1 is provided with a tubular discharge vessel 5 which is closed in a gastight manner and which contains an ionizable filling. The filling in this case comprises 5 mg mercury and a rare gas, argon with a filling pressure of 6 mbar here. The discharge vessel 5 has a luminescent layer 5' on an inner surface. The lamp is in addition provided with electrodes 6a, 6b for maintaining an electric discharge in the discharge vessel 5. At least one of the electrodes, 6a, is positioned in the discharge vessel 5. In this case both electrodes 6a, 6b are positioned there, each in a respective end portion 50a, 50b of the discharge vessel 5. The electrodes 6a, 6b each have a coil 60a, 60b of a refractory metal which is electrically connected to current conductors 7a, 7a'; 7b, 7b' which extend to outside the discharge vessel 5 and are connected to the supply unit 4 there.

Figure 2:
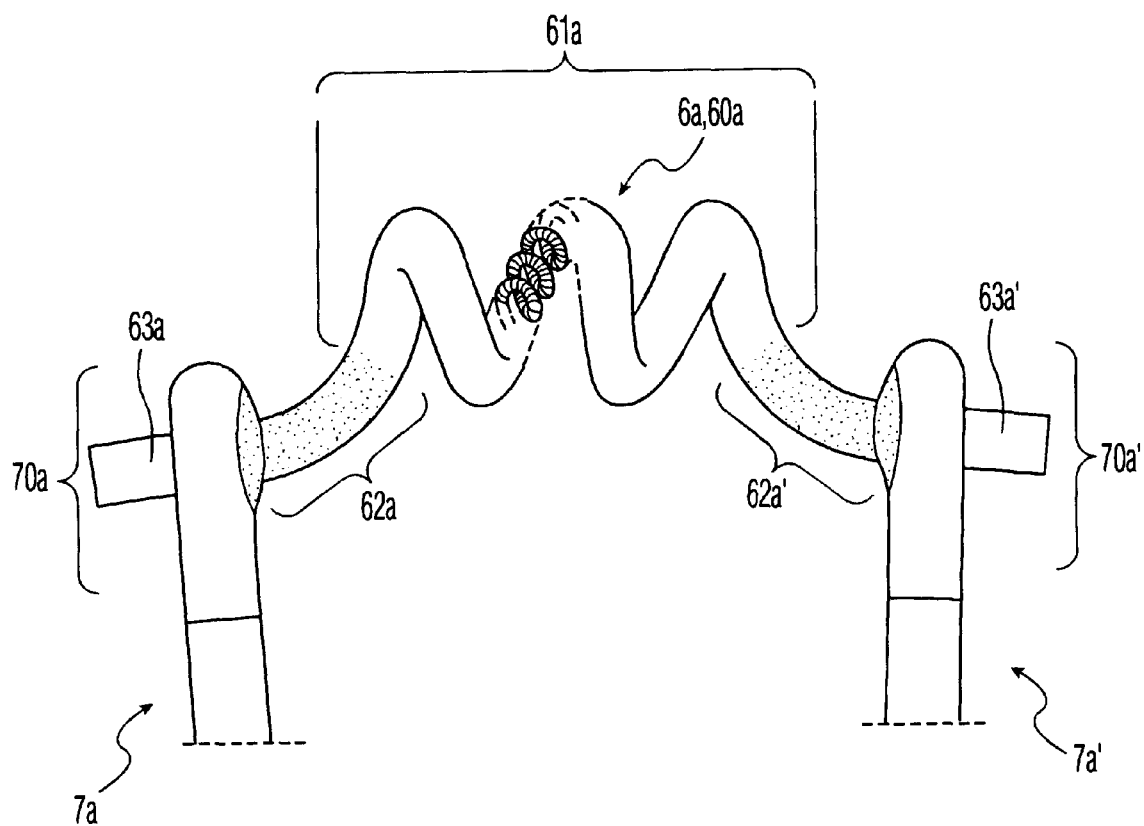
FIG. 2 shows a detail II from FIG. 1.

FIG. 2 shows one of the electrodes, 6a, in more detail. The other electrode 6b has an identical construction. The coil 60a of the electrode 6a has three tertiary turns which are formed from 57 secondary turns which again are formed from tungsten wire having a primary coiling. The tungsten wire has a diameter of 43 μm. The coil 60a has a central portion 61a comprising 45 secondary turns and coated with an electron-emitting material. The electron-emitting material here comprises barium oxide, mixed with calcium oxide and strontium oxide in this case. The electrode 6a has an end portion 62a, 62a' on either side, each having a length of six secondary turns, between the central portion 61a and a respective current conductor 7a, 7a'. The current supply conductors 7a, 7a' each have a bent end zone 70a, 70a', The coil 60a is electrically connected to the current supply conductors in that the end portions 62a, 62a' are each tightly pinched in a respective bent end zone 70a, 70a'.

The end portions 62a, 62a' are coated with a protective material. The protective material is mainly formed by one or several oxides of calcium and/or magnesium. In this case the protective material is calcium oxide.

Lamps in accordance with the embodiment shown are manufactured as follows. A first suspension of a mixture of the alkaline earth metal carbonates: barium carbonate, calcium carbonate, and strontium carbonate with butylacetate as a suspension agent and nitrocellulose as a binder is applied to the central portion 61a of the coil 60a of the electrode 6a. After the first suspension has been dried, a second suspension comprising calcium carbonate, the above suspension agent and the above binder is applied to the end portions 62a, 62a' of the coil 60a. The second suspension then overlaps the first suspension over a length of approximately 1 mm. The second suspension also flows out over the surfaces of the end zones 70a, 70a' of the current supply conductors 7a, 7a' facing towards the coil 60a. The electrode 6b is subjected to the same operations. Then the electrodes 6a, 6b are mounted in the discharge vessel 5 and are heated by current passage. The calcium carbonate present in the second suspension is entirely converted into calcium oxide, including the suspension present on the end zones 70a, 70a', Then the discharge vessel 5 is flushed, evacuated, given its filling, and sealed.

In the lamps thus manufactured, the coil 60a of the electrode 6a has ends 63a, 63a' which extend to beyond the current supply conductors 7a, 7a'. These ends 63a, 63a' are left uncovered. It was found that the presence of protective material on these ends 63a, 63a' is not relevant to the switching life. However, the application of a discharge thereon may lead to sputtering of this material, which in its turn will lead to a discoloration of the discharge vessel. This may also have an adverse effect on the operation of the emitter. The ends 63a, 63a', therefore, are preferably kept short. If so desired, they may be removed, for example by burning or cutting, before the electrodes are fastened in the discharge vessel.

To investigate the effect of the measure on the switching life, ten lamps according to the invention as shown in FIGS. 1 and 2 were operated on a cold-igniting supply. The lamps were periodically operated for one minute at their rated power (11 W) and switched off for three minutes each time. The ten lamps had an average switching life of 10,500 switching-on operations. For comparison, six lamps were manufactured in which the end portions of the coils of the electrodes were without a protective layer, but which corresponded to the lamp of FIGS. 1 and 2 in all other respects. These lamps had an average switching life of 3500 switching-on operations with the same manner of operation. The above comparison shows that the method according to the invention leads to a considerable increase in the switching life.

What is claimed is:

1. A low-pressure discharge lamp provided with a discharge vessel (5) which is closed in a gastight manner and which contains an ionizable filling, and further provided with electrodes (6a, 6b) for maintaining an electric discharge in the discharge vessel (5), at least one of the electrodes (6a) being positioned inside the discharge vessel (5), which electrode (6a) comprises a coil (60a) of a refractory metal which is electrically connected to current conductors (7a, 7a') which extend to outside the discharge vessel (5), which coil (60a) has a central portion (61a) which is coated with an electron-emitting material and has end portions (62a, 62a') on either side between the central portion (61a) and respective current conductors (7a, 7a'), which end portions (62a, 62a') are coated with a protective material consisting essentially of at least one oxide of at least one of calcium and magnesium.

2. A low pressure discharge lamp as claimed in claim 1, characterized in that the electron-emitting material comprises barium oxide.

3. A low-pressure discharge lamp as claimed in claim 1 wherein both of the electrodes are provided with said protective material.

4. A compact fluorescent lamp comprising a housing (1) supporting a low-pressure discharge lamp (2) as claimed in claim 1, wherein the ionizable filling comprises mercury and at least one rare gas, wherein the discharge vessel (5) is provided with a luminescent layer (5*a*') on an inner surface, wherein the housing (1) in addition supports a lamp cap (3) with contacts (3*a*, 3*b*), and wherein a cold-igniting supply unit (4) for the low-pressure discharge lamp (2) is accommodated in the housing (1), said supply unit (4) being connected to the contacts (3*a*, 3*b*).

\* \* \* \* \*